US 11,222,574 B2

(12) United States Patent
Kubota

(10) Patent No.: US 11,222,574 B2
(45) Date of Patent: Jan. 11, 2022

(54) METHOD OF PRODUCING DISPLAY

(71) Applicant: TOPPAN PRINTING CO., LTD., Tokyo (JP)

(72) Inventor: Masashi Kubota, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/082,829

(22) Filed: Oct. 28, 2020

(65) Prior Publication Data

US 2021/0043128 A1  Feb. 11, 2021

Related U.S. Application Data

(63) Continuation of application No. PCT/JP2019/021139, filed on May 28, 2019.

(30) Foreign Application Priority Data

Jun. 11, 2018 (JP) .............................. JP2018-110904

(51) Int. Cl.
*G09G 3/20* (2006.01)
*G09G 5/02* (2006.01)

(52) U.S. Cl.
CPC ........... *G09G 3/2003* (2013.01); *G09G 5/026* (2013.01); *G09G 2380/04* (2013.01)

(58) Field of Classification Search
CPC .. G09G 3/2003; G09G 5/026; G09G 2380/04; G02B 5/18; B42D 25/41;

(Continued)

(56) References Cited

U.S. PATENT DOCUMENTS

2010/0238330 A1* 9/2010 Hirota ............... H01L 27/14645
348/273
2011/0069328 A1* 3/2011 Ulichney ............. H04N 1/4055
358/1.9

(Continued)

FOREIGN PATENT DOCUMENTS

JP  2011-230473 A  11/2011
JP  2014-008746 A   1/2014

(Continued)

OTHER PUBLICATIONS

International Searching Authority, "International Search Report," issued in connection with International Patent Application No. PCT/JP2019/021139, dated Aug. 6, 2019.

(Continued)

*Primary Examiner* — Brent D Castiaux
(74) *Attorney, Agent, or Firm* — Foley & Lardner LLP

(57) ABSTRACT

A method when expressing gradation for a color image including binarizing tone values of first image data to produce second image data including pixels each having colors with respective binarized tone values, classifying pixels of the first image data into a plurality of first pixel groups and specifying a pixel where a color centroid is positioned for each color in each first pixel group, classifying pixels of the second image data into second pixel groups PXG2 corresponding to the first pixel groups and calculating the number of light pixels for each color in each second pixel group, producing third image data from the second image data, information related to the color centroid, and information related to the number of light pixels, and producing fourth image data by changing the position of a light pixel with the position of a dark pixel in the third image data.

15 Claims, 7 Drawing Sheets

(58) Field of Classification Search
CPC .... B42D 25/47; B42D 25/324; B42D 25/305; B42D 25/23; B42D 25/351; B42D 25/425; B42D 25/328; B41M 5/382; B41J 2/325

See application file for complete search history.

(56) References Cited

U.S. PATENT DOCUMENTS

2012/0230601 A1* 9/2012 Iso .......................... G06T 5/002
382/269
2019/0016151 A1* 1/2019 Kishimoto ............. B41M 5/382

FOREIGN PATENT DOCUMENTS

WO    WO 2017/146199 A1 * 2/2017
WO    WO-2017/146199 A1    8/2017

OTHER PUBLICATIONS

International Searching Authority, "Written Opinion," issued in connection with International Patent Application No. PCT/JP2019/021139, dated Aug. 6, 2019.

* cited by examiner

METHOD OF PRODUCING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/021139, filed on May 28, 2019, which is based upon and claims the benefit of priority to Japanese Patent Application No. 2018-110904, filed on Jun. 11, 2018, the disclosures of which are all incorporated herein by reference in their entireties.

TECHNICAL FIELD

The present invention relates to a method of producing a display obtained by performing transfer using image data.

BACKGROUND

Image recording by thermal transfer can be used, for example, for on-demand production of a display by using raster image data. As an image recording method using thermal transfer, there are known, for example, a fusion thermal transfer recording method or a sublimation thermal transfer recording method (PTLs 1 and 2).

The fusion thermal transfer recording method uses a transfer foil including a substrate and a transfer layer separably supported by the substrate. The transfer layer includes an adhesive layer on the outermost surface. This transfer foil, with the adhesive layer brought into contact with a transfer target, is pressed against the transfer target. In this state, the transfer foil and the transfer target are heated and then the substrate is separated from the transfer target. In this way, the portions of the transfer layer subjected to heating (termed display elements hereinafter) are transferred from the substrate to the transfer target.

The transfer layer may have a multilayer structure. In this case, the transfer layer may be provided, for example, with a diffraction grating. The diffraction grating can be appropriately designed in terms of the grating constant or the length or direction of the grooves to display various colors, such as red, green and blue, under specific illumination and observation conditions. Accordingly, use of a transfer foil, in which the transfer layer includes a diffraction grating, can achieve a display, for example, which displays a color image with diffracted light.

[Citation List] [Patent Literature] PTL 1: JP 2011-230473 A; PTL 2: JP 2014-8746 A.

SUMMARY OF THE INVENTION

Technical Problem

The transfer foil, in which the transfer layer includes a diffractive structure such as a diffraction grating, is usually provided with a reflective layer to enhance diffraction efficiency. In general, reflective layers made of metal have low light transmittance. Therefore, when producing a display by using a transfer foil in which the transfer layer includes a reflective layer made of metal, display elements exhibiting different colors are transferred and arranged so as not to be overlapped with each other in or between the pixels arranged in a matrix. Reflective layers made of a transparent material, such as zinc oxide, usually have high light transmittance. Therefore, when producing a display by using a transfer foil in which the transfer layer includes a transparent reflective layer, display elements exhibiting different colors can be transferred and arranged being overlapped with each other in the pixels.

A display obtained by using a transfer foil in which the transfer layer includes a diffraction grating enables a gradation expression using an area gradation method and a gradation expression using a pseudo gradation method.

In the case where gradation is expressed for a monochrome image by using an area gradation method, for example, display elements are not provided to every pixel, or only one display element is provided to every pixel, and display elements are permitted to be different in size between pixels where they are arranged, according to the tone value of the pixel. If this method is applied to gradation expression for a color image, and display elements displaying different colors are transferred to pixels and arranged therein, being overlapped with each other, there may occur a situation where small display elements are transferred onto large display elements. Stable transfer of small display elements is difficult if, in particular, the transfer layer includes a release layer as a layer contacting the substrate.

In the case where gradation is expressed for a monochrome image by using a pseudo gradation method, each pixel is configured by multiple subpixels, and the number of subpixels for arranging display elements is changed according to the tone value of the pixel. Specifically, in the pseudo gradation method, unlike in the area gradation method, a suitable number of display elements for the tone value, each having the same size, are arranged in each pixel. Even if this method is applied to a gradation expression for a color image, and display elements displaying different colors are transferred to pixels and arranged therein, being overlapped with each other, stable transfer can be performed because the display elements have the same size.

However, the inventor of the present invention has found that there is still room for improving the image quality in the case where the pseudo gradation method is applied to gradation expression for a color image. For example, a pixel expressing a halftone may include subpixels in each of which all the display elements of red, green and blue colors are arranged, and subpixels where no display elements are arranged. In such a case, high reproducibility and visibility are not necessarily achieved.

The present invention aims to achieve stable transfer and excellent image quality when expressing gradation for a color image through a pseudo gradation method by using a fusion thermal transfer recording method.

Solution to Problem

According to a first aspect of the present invention, there is provided a method of producing image data, including: preparing first image data as data of a color image expressed by two or more colors, the first image data including pixels each having colors with respective tone values each corresponding to three or more levels; binarizing the tone values of the first image data to produce second image data, the second image data including pixels each having colors with respective binarized tone values; classifying the pixels of the first image data into a plurality of first pixel groups and specifying a pixel where a color centroid is positioned for each color in each of the plurality of first pixel groups; classifying the pixels of the second image data into a plurality of second pixel groups corresponding to the plurality of first pixel groups and calculating the number of light pixels for each color in each of the plurality of second pixel groups; producing third image data including pixels each having colors with respective binarized tone values, the pixels being classified into a plurality of third pixel groups corresponding to the plurality of first pixel groups and the plurality of second pixel groups, the third image data being produced so that the number of light pixels for each color in each of the plurality of third pixel groups is equal to the number of light pixels in the corresponding one of the second pixel groups and so that, in each of the third pixel groups including the light pixels among the plurality of third pixel groups, the position of one of the light pixels matches the position of the pixel where the color centroid is positioned in the corresponding one of the first pixel groups; and producing fourth image data including a smaller number of pixels each of which is light for all colors than in the third image data, by selecting pixels each of which is light for all colors from the third image data and, when the selected pixel for at least one color does not correspond to the pixel where the color centroid is positioned in the first pixel group and when the third pixel group including the selected pixel includes at least one dark pixel, changing the selected pixel from light to dark for at least one of the at least one color and changing one other pixel from dark to light.

According to a second aspect of the present invention, there is provided a method of producing a display, including forming a first image on a transfer target by transferring two or more types of display elements respectively including diffractive structures and displaying colors different from each other onto the transfer target, based on the fourth image data obtained by the method of producing image data according to the first aspect.

According to a third aspect of the present invention, there is provided a display which is obtained by the production method according to the second aspect.

According to a fourth aspect of the present invention, there is provided a program allowing a computer to execute: a step of binarizing tone values of respective colors in each of pixels of first image data, the tone values each corresponding to three or more levels, the first image data being data of a color image expressed by two or more colors, and producing second image data having the binarized tone values of respective colors in each of the pixels; a step of classifying the pixels of the first image data into a plurality of first pixel groups and specifying a pixel where a color centroid is positioned for each color in each of the plurality of first pixel groups; a step of classifying the pixels of the second image data into a plurality of second pixel groups corresponding to the plurality of first pixel groups and calculating the number of light pixels for each color in each of the plurality of second pixel groups; a step of producing third image data including pixels each having colors with respective binarized tone values, the pixels being classified into a plurality of third pixel groups corresponding to the plurality of first pixel groups and the plurality of second pixel groups, the third image data being produced so that the number of light pixels for each color in each of the plurality of third pixel groups is equal to the number of light pixels in the corresponding one of the second pixel groups and so that, in each of the third pixel groups including the light pixels among the plurality of third pixel groups, the position of one of the light pixels matches the position of the pixel where the color centroid is positioned in the corresponding one of the first pixel groups; and a step of producing fourth image data including a smaller number of pixels each of which is light for all colors than in the third image data, by selecting pixels each of which is light for all colors from the third image data and, when the selected pixel for at least one color does not correspond to the pixel where the color centroid is positioned in the first pixel group and when the third pixel group including the selected pixel includes at least one dark pixel, changing the selected pixel from light to dark for at least one of the at least one color and changing one other pixel from dark to light.

According to a fifth aspect of the present invention, there is provided a computer readable recording medium in which the program according to the fourth aspect is recorded.

According to a sixth aspect of the present invention, there is provided a display production system including a computer in which the program according to the fourth aspect is stored, and a transfer device that transfers two or more types of display elements onto a transfer target, the display elements respectively including diffractive structures and displaying colors different from each other.

Advantageous Effects of the Invention

According to the present invention, stable transfer and excellent image quality can be achieved when expressing gradation for a color image through a pseudo gradation method by using a fusion thermal transfer recording method.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

Figure 1:
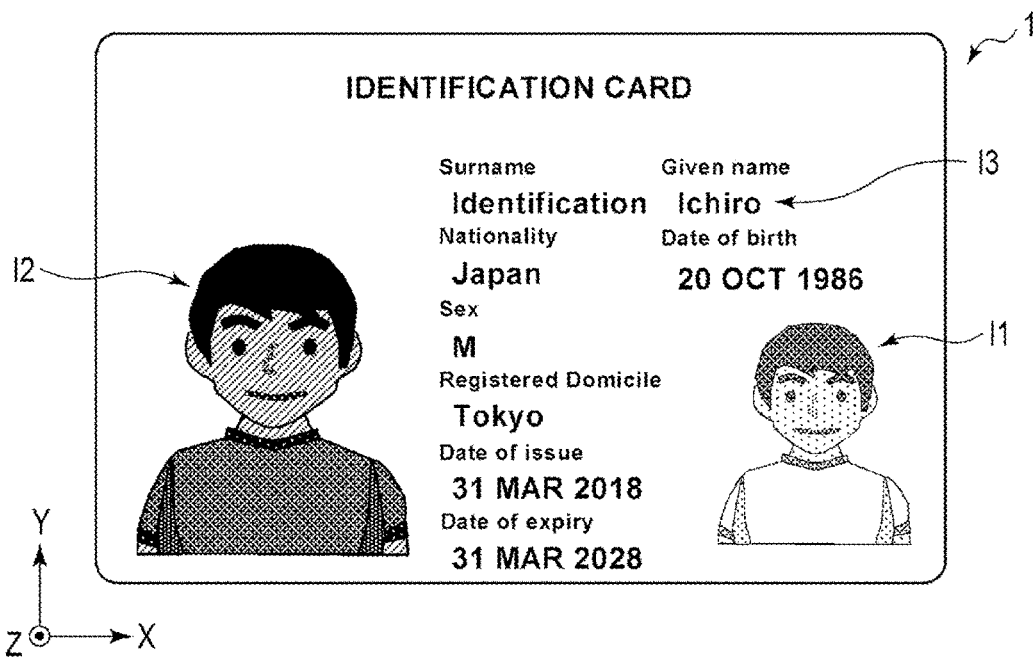
FIG. 1 is a schematic plan view illustrating a display according to an embodiment of the present invention.
Figure 2:
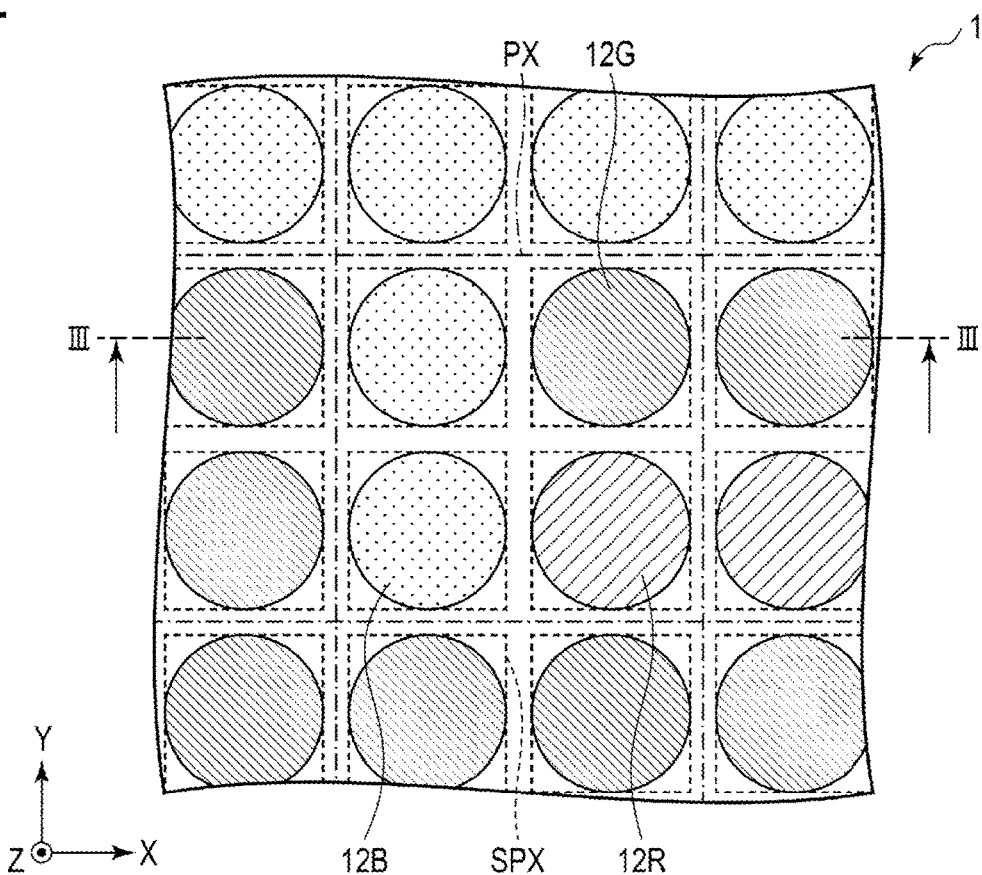
FIG. 2 is an enlarged partial plan view illustrating the display shown in FIG. 1.
Figure 3:
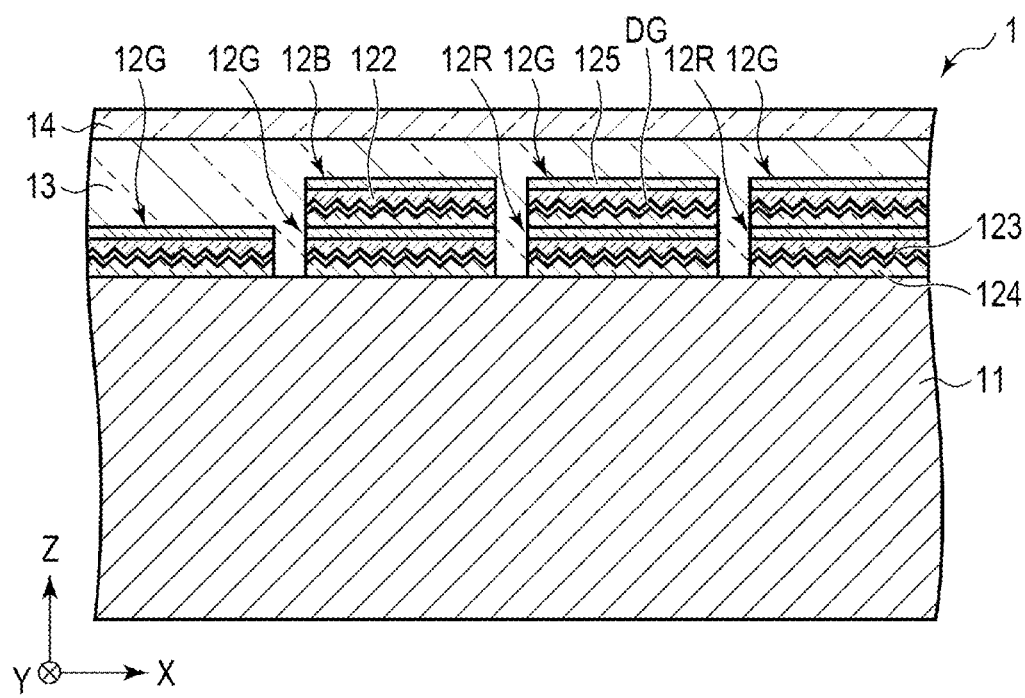
FIG. 3 is a cross-sectional view taken along the line of the display shown in FIG. 2.
Figure 4:
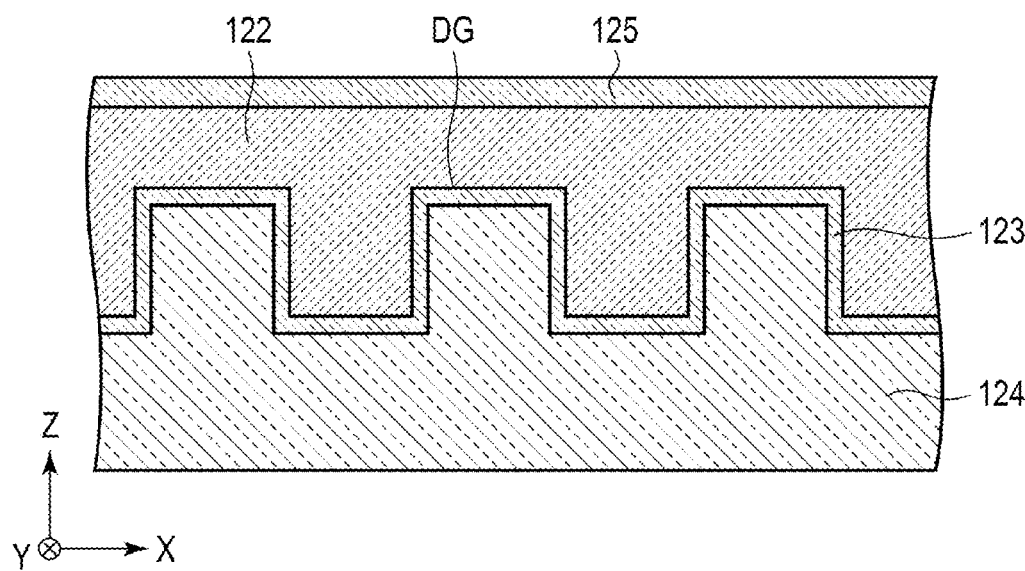
FIG. 4 is a schematic cross-sectional view illustrating an example of a structure that can be used for display elements included in the display shown in FIGS. 1 to 3.

FIG. 1 is a schematic plan view illustrating a display according to an embodiment of the present invention. FIG. 2 is an enlarged partial plan view illustrating the display shown in FIG. 1. FIG. 3 is a cross-sectional view taken along the line of the display shown in FIG. 2. FIG. 4 is a schematic cross-sectional view illustrating an example of a structure that can be used for display elements included in the display shown in FIGS. 1 to 3. It should be noted that the X direction is a direction parallel to the display surface of a display 1, the Y direction is a direction parallel to the display surface of the display 1 and perpendicular to the X direction, and the Z direction is a direction perpendicular to the X and Y directions.

FIGS. 1 to 3 show a display 1 serving as an identification (ID) card. The display 1 may be an employee ID card, a student ID card, or a driver's license. The configuration explained for the display 1 can be applied to passports, or valuable securities such as paper currencies.

As shown in FIG. 3, the display 1 includes a support 11, display elements 12R, 12G and 12B, a print layer, not shown, a resin layer 13, and a protective layer 14.

The support 11 is a transfer target. Materials that can be used for the support 11 may be, for example, plastic boards, paper or combinations thereof. The support 11 may be provided with an image-receiving layer on the surface thereof to assist thermal transfer. The support 11 may incorporate an integrated circuit (IC) chip, an antenna enabling contactless communication with the IC chip, or may incorporate other components.

As shown in FIG. 1, a first image I1, a second image I2 and a third image I3 are recorded on the support 11.

The first image I1 is displayed using diffracted light.

In the region on the support 11 where the first image I1 is recorded, pixels PX shown in FIG. 2 are arranged in a matrix. As an example, herein, the pixels PX are assumed to be arranged in the X and Y directions.

The pixels PX each include three or more subpixels SPX. In each pixel PX, the subpixels SPX may be arranged in one direction or in two directions. As an example, herein, each pixel PX is assumed to include four subpixels SPX arranged in the X and Y directions.

The subpixels SPX include those which include one or more types of the display elements 12R, 12G and 12B, and those which include none of the display elements 12R, 12G and 12B. The subpixels SPX may be only those which each include one or more types of the display elements 12R, 12G and 12B.

In the subpixels SPX each including one or more types of the display elements 12R, 12G and 12B, only one display element can be arranged per type. As shown in FIG. 3, in the subpixels SPX each including two or more types of the display elements 12R, 12G and 12B, the display elements are laminated with each other. As an example, herein, the display elements 12R, 12G and 12B are assumed to be laminated on the support 11 in this order.

The display elements 12R, 12G and 12B present colors that are different from each other. Each pixel PX can display various colors by additive color mixing of diffracted light which emerges from the display elements arranged in the subpixels SPX. The display element 12B may be omitted. In addition to the display elements 12R, 12G and 12B, the display 1 may further include one or more types of display elements for displaying colors different from those which are presented by the display elements 12R, 12G and 12B.

As an example, herein, the display elements 12R, 12G and 12B are assumed to respectively display red, green and blue colors. Specifically, herein, the display elements 12R, 12G and 12B are assumed to emit diffracted light of red, green and blue colors toward the observer under specific illumination and observation conditions.

The display elements 12R are equal to each other in shape and size. The display elements 12G are equal to each other in shape and size. The display elements 12B are equal to each other in shape and size.

The display elements 12R, 12G and 12B may be different from each other in shape and size, but are preferred to be equal to each other in shape and size. If the display elements 12R, 12G and 12B are equal to each other in shape and size, the display elements 12R, 12G and 12B can be stably transferred, when producing the display 1, without impairing the brightness of the first image I1. As an example, herein, the display elements 12R, 12G and 12B are assumed to have circular shapes with the diameters equal to each other as viewed in the Z direction.

In the case where adjacent first and second subpixels SPX respectively include one or more of the display elements 12R, 12G and 12B, the display elements included in the first subpixel SPX may be spaced apart, as shown in FIG. 2, from the display elements included in the second subpixel SPX. Alternatively, in this case, the display elements included in the first subpixel SPX may be in contact with the display elements included in the second subpixel SPX.

As shown in FIG. 3, the display elements 12R, 12G and 12B each include a relief structure forming layer 122, a reflective layer 123, an adhesive layer 124 and a protective layer 125.

The relief structure forming layer 122 is a transparent resin layer. The relief structure forming layer 122 has a first major surface on which a relief type diffractive structure DG is provided. For example, the diffractive structure DG is a diffraction grating or a hologram. According to an example, the diffractive structure DG includes straight or arcuate grooves arranged in the width direction. In a cross section perpendicular to the length direction of the grooves, the diffractive structure DG may have a triangular wave shape as shown in FIG. 3, or may have a rectangular wave shape as shown in FIG. 4, or may have a sinusoidal shape.

The pitch, i.e., the grating constant, of the grooves affects the colors displayed by the diffractive structure DG under specific illumination and observation conditions. The display elements 12R, 12G and 12B have respective diffractive structures DG whose grating constants are different from each other. The diffractive structures DG of the display elements 12R, 12G and 12B are designed so that the observer can perceive visible light under specific illumination and observation conditions. The grating constants are in the range of several hundreds of nanometers to several micrometers.

The depth of the grooves affects the diffraction efficiency of the diffractive structure DG. For example, the grooves may have a depth in the range of several tens of nanometers to several hundreds of nanometers.

For example, the relief structure forming layer 122 may be made of a thermosetting resin or an ultraviolet curable resin. For example, a relief structure forming layer 122 made of a UV curable resin can be obtained by pressing a plate against a UV curable resin layer, irradiating the resin layer with ultraviolet rays in this state, and then releasing the plate from the resin layer. For example, a relief structure forming layer 122 made of a thermosetting resin can be obtained by pressing a plate against a thermosetting resin layer, heating the resin layer in this state, and then releasing the plate from the resin layer.

The reflective layer 123 is provided to the first major surface of the relief structure forming layer 122 provided with the diffractive structure DG. The reflective layer 123 has a surface configuration conforming to the diffractive structure DG of the relief structure forming layer. The reflective layer 123 is provided to enhance the diffraction efficiency of the diffractive structure DG.

The reflective layer 123 is a transparent reflective layer through which visible light is transmitted. Materials that can be used for the reflective layer 123 may be, for example, transparent dielectric materials, such as zinc sulfide and zinc selenide. The reflective layer 123 may have a monolayer structure, or may have a multilayer structure. In the case of the latter, a multilayer film may be used as the reflective layer 123. In the multilayer film, in this case, a plurality of transparent dielectric layers are laminated so that adjacent layers have different refractive indices.

Of the display elements 12R, 12G and 12B, the element positioned farthest from the observer when laminated does not have to include a reflective layer 123 which is transparent. For example, such a reflective layer 123 may be a metal layer made of aluminum, gold or silver, or an alloy thereof.

The reflective layer 123 may be formed, for example, by a vapor deposition method, such as sputtering or vacuum deposition.

The adhesive layer 124 is formed on the reflective layer 123. The adhesive layer 124 is a transparent resin layer. For example, the adhesive layer 124 may be made of a thermoplastic resin. Materials that can be used for the adhesive layer 124 may be, for example, an epoxy resin, polyester, vinyl chloride, or polyvinyl acetate. Highly adhesive materials have high viscosity. Therefore, if the adhesive layer 124 is formed only using such a material, good suitability to foil tearing is not necessarily achieved. If a mixture of the above resin and microparticles such as of a filler is used as a material for the adhesive layer 124, even better suitability to foil tearing can be achieved compared to the case where only a resin is used as the material.

The adhesion between the reflective layer 123 and the adhesive layer 124 may not necessarily be sufficient. In such a case, an anchor coat layer may be provided between the reflective layer 123 and the adhesive layer 124 to enhance adhesion therebetween.

The protective layer 125 is provided to a second major surface of the relief structure forming layer 122 facing away from the surface provided with the diffractive structure DG. The protective layer 125 is a transparent resin layer. The protective layer 125 protects the relief structure forming layer 122 or other components from physical damage, chemicals, or the like. Low adhesion of the protective layer 125 to the substrate of a transfer foil described later can facilitate transfer of the display elements. Materials that can be used for the protective layer 125 may be, for example, acrylic resins or epoxy resins. These materials may be used by mixing a polyester therewith to control adhesion.

The second image I2 shown in FIG. 1 is displayed using a dye and/or a pigment. In this example, the second image I2 has a shape similar to that of the first image I1. Specifically, herein, the first and second images I1 and I2 include facial images of the same person.

The second image I2 may have a shape different from that of the first image I1. In this example, the second image I2 has a larger size than the first image I1. However, these images may have the same size, or the second image I2 may have a smaller size than the first image I1. The second image I2 may be omitted.

The third image I3 is displayed using a dye and/or a pigment. In this example, the third image I3 includes character strings expressing the personal information of the person displayed by the first and second images I1 and I2, or other information. The third image I3 may further include another image such as of a pattern, diagram, photograph, or the like. The third image I3 may be omitted.

The support 11 has regions thereon where the second and third images I2 and I3 are recorded respectively. These regions are each provided with a print layer containing a dye and/or a pigment. The print layers respectively display the second and third images I2 and I3. For example, the print layers may be formed by using one or more methods from among a fusion thermal transfer recording method, a sublimation thermal transfer recording method, and a recording method, such as screen printing, using a printing ink.

Part of the second image I2 may be recorded making use of carbonization caused by laser beam irradiation. Part or all of the third image I3 may be recorded making use of carbonization caused by laser beam irradiation.

The resin layer 13 shown in FIG. 3 covers the entirety of a major surface of the support 11 where the first, second and third images I1, I2 and I3 are recorded. The resin layer 13 adheres the protective layer 14 to the support 11.

The resin layer 13 is made of a transparent resin. As the transparent resin, for example, the materials mentioned for the adhesive layer 124 may be used.

The resin layer 13 may cover only part of the above major surface, e.g., only the regions where the first, second and third images I1, I2 and I3 are recorded and the regions surrounding these images. The resin layer 13 may be omitted.

The protective layer 14 faces the entirety of the above major surface of the support 11 where the first, second and third images I1, I2 and I3 are recorded, via the resin layer 13. The protective layer 14 protects the first, second and third images I1, I2 and I3 from physical damage, chemicals, or the like. As the materials for the protective layer 14, for example, the materials mentioned for the protective layer 125 may be used.

The protective layer 14 may cover only part of the above major surface, e.g., only the regions where the first, second and third images I1, I2 and I3 are recorded and the regions surrounding these images. The protective layer 14 may be omitted.

Next, a method of producing the display 1 will be described.

Figure 5:
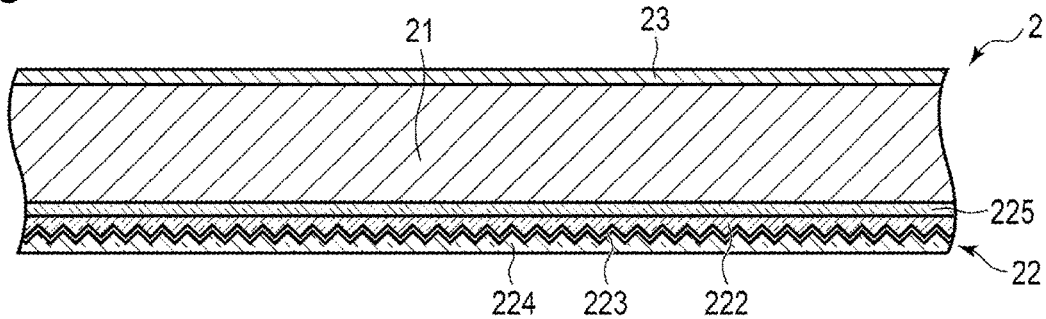
FIG. 5 is a schematic cross-sectional view illustrating an example of a transfer foil that can be used for producing the display shown in FIGS. 1 to 3.

FIG. 5 is a schematic cross-sectional view illustrating an example of a transfer foil that can be used for producing the display shown in FIGS. 1 to 3.

FIG. 5 shows a transfer foil 2 including a substrate 21, a transfer layer 22 and a back coat layer 23.

The substrate 21 is a film having a first major surface which separably supports the transfer layer 22. As the substrate 21, for example, a polyethylene terephthalate film may be used.

The transfer layer 22 includes a relief structure forming layer 222, a reflective layer 223, an adhesive layer 224 and a protective layer 225. A part of the transfer layer 22 corresponds to any of the display elements 12R, 12G and 12B shown in FIGS. 2 and 3. Specifically, the relief structure forming layer 122, the reflective layer 123, the adhesive layer 124 and the protective layer 125 are respectively parts of the relief structure forming layer 222, the reflective layer 223, the adhesive layer 224 and the protective layer 225.

The back coat layer 23 is provided to a second major surface, or a rear surface, of the substrate 21 facing away from the surface provided with the transfer layer 22. The back coat layer 23, which directly contacts a thermal head, is required to have high heat resistance.

The back coat layer 23 can be obtained, for example, by applying a material containing an ultraviolet curable resin, an acrylic resin and an isocyanate curing agent as main resins, and irradiating the coating film with ultraviolet rays. The back coat layer 23 is preferred to have a thickness in the range of about 0.2 µm to about 2.0 µm. It is required that the friction between the back coat layer 23 and the thermal head is small. Therefore, the back coat layer 23 may contain wax to obtain good lubrication with the thermal head, or may contain talc or filler to reduce the contact area with the thermal head.

Figure 6:
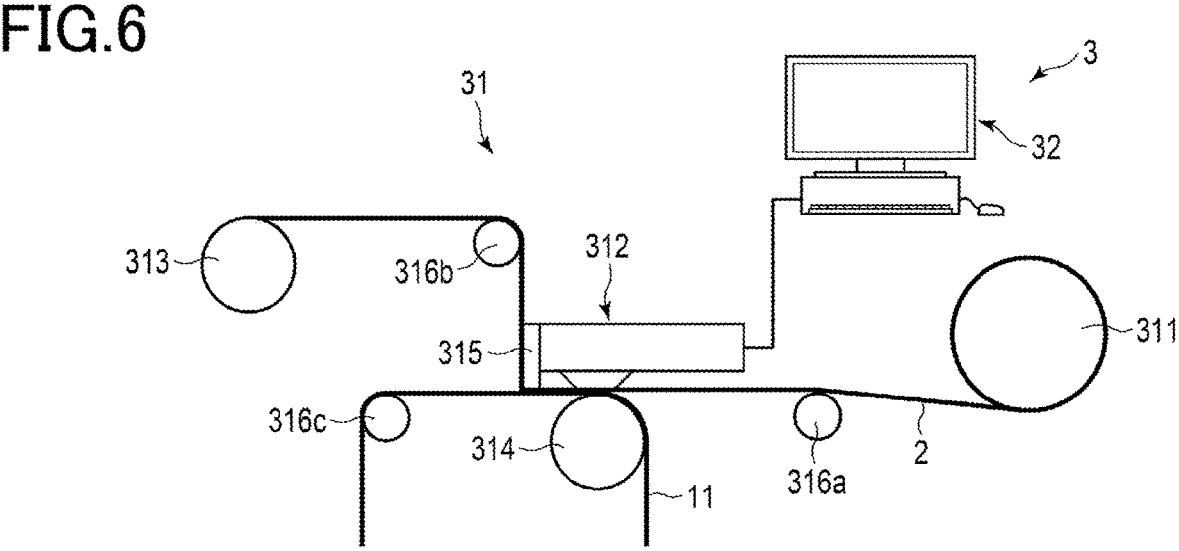
FIG. 6 is a schematic diagram illustrating a production system for a display according to an embodiment of the present invention.
Figure 7:
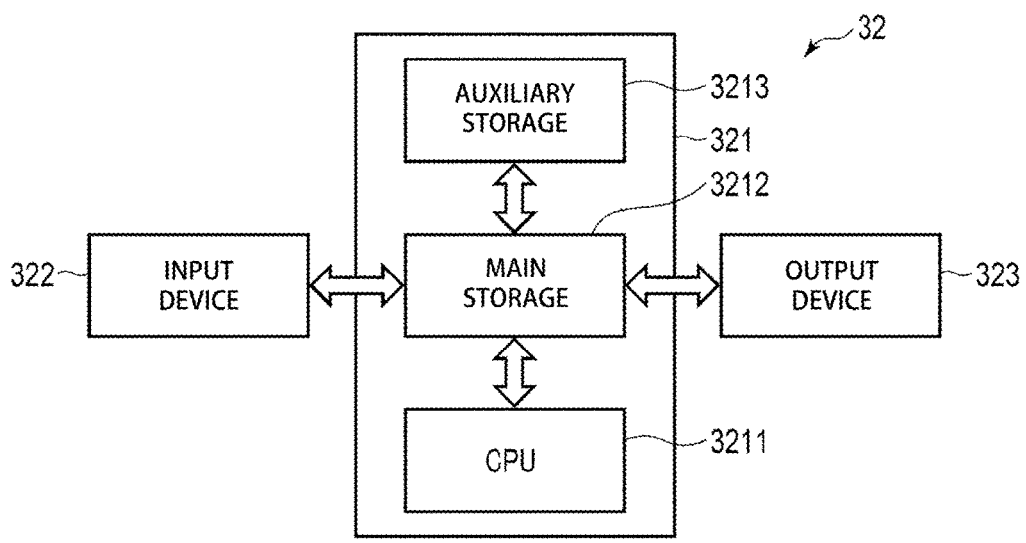
FIG. 7 is a block diagram illustrating part of the production system shown in FIG. 6.

FIG. 6 is a schematic diagram illustrating a production system for a display according to an embodiment of the present invention. FIG. 7 is a block diagram illustrating part of the production system shown in FIG. 6.

FIG. 6 shows a production system 3 including a transfer device 31 and a computer 32.

The transfer device 31 includes an unwinding part 311, a thermal head 312, a take-up part 313, a platen roller 314, a release plate 315, and guide rollers 316a to 316c.

The unwinding part 311 unwinds the transfer foil 2 wound about an unwinding core. The unwinding part 311 detachably supports the unwinding core about which the transfer foil 2 is wound, and includes an unwinding shaft that is designed to keep the torque constant during the transfer operation. The unwinding shaft applies tension to the transfer foil 2 while it is unwound. For example, a generally used fixed-torque limiter is used for controlling the torque. Alternatively, a variable torque limiter that can change torque by controlling the friction or the like may be used. Furthermore, for the reason of reusing the transfer foil 2 or other reasons, a motor may be attached to the unwinding shaft, and the current supplied to the motor may be controlled to control the torque.

The transfer foil 2 unwound from the unwinding part 311 and guided by the guide rollers 316a and 316b is taken up on the take-up core of the take-up part 313. The take-up part 313 includes a take-up shaft and a take-up mechanism. The take-up shaft includes a take-up core which is detachably attached thereto to wind the used transfer foil 2. The take-up mechanism includes a motor or the like which rotates the take-up shaft to take up the transfer foil 2 about the take-up core. The take-up part 33 is usually provided with a torque limiter between the take-up shaft and the take-up core to perform winding at constant torque.

When controlling torque during unwinding and winding of the transfer foil 2, it is preferred to make use of the diameter of the roll of the transfer foil 2 wound about the unwinding core and the diameter of the roll of the transfer foil 2 wound about the take-up core. Rotary encoders may be respectively provided to the unwinding part 311 and the take-up part 313, and the outputs of these encoders may be analyzed to calculate the above diameters and control torque even more correctly.

If the support 11 as a transfer target is in a roll form, unwinding and winding thereof can be performed under the same torque control as described for the transfer foil 2.

The feed rates of the support 11 and the transfer foil 2 are required to exactly match each other. Therefore, it is preferred that the unwinding part or the like that unwinds the support 11 is provided with a rotary encoder similar to one described for the transfer foil 2, and the roll diameter is constantly monitored to perform control under which the same feed rates are kept for the support 11 and the transfer foil 2.

If the support 11 has rigidity to some extent as paper does, the support 11 may be conveyed in a sheet form. Also in this case, the conveying speed is preferred to be controlled as described above.

The transfer foil 2 and the support 11 which are synchronously conveyed in this way are sandwiched between the thermal head 312 and the platen roller 314 to bring the transfer layer 22 of the transfer foil 2 into contact with the support 11, and thermally pressed against each other. Through this process, portions of the transfer layer 22 are transferred to the support 11.

The thermal head 312 heats the transfer foil 2. The thermal head 312 contains microresistors arranged in an array. These resistors generally have a size in the range of several tens of micrometers to several hundreds of micrometers. Current can be independently passed through these resistors. During transfer operation, current is passed through these resistors according to data to instantaneously generate heat in the resistors. Due to the generated heat, portions of the transfer layer 22 are transferred to the support 11.

In general, thermal heads have surfaces on which ceramics are deposited in the thickness of several tens of micrometers to protect the resistors. Materials deposited include, for example, SiC and SiON having high durability, and materials obtained by mixing these materials with other materials.

The platen roller 314 is disposed adjacent to the thermal head 312 sandwiching the transfer foil 2 and the support 11 therebetween. The platen roller 314 assists the heating performed by the thermal head 312. Furthermore, the platen roller 314 applies pressure to the transfer foil 2 and the support 11, together with the thermal head 312.

For example, the platen roller 314 has a structure in which a resin layer covers a metal shaft. The heat of the thermal head 312 is substantially directly transferred to the platen roller 314. Therefore, a resin having good heat resistance may desirably be used for the resin layer of the platen roller 314.

In the transfer device 31, the transfer foil 2 and the support 11 are required to be correctly controlled for the feed amount. For example, if transfer is performed at 300 dpi (dots per inch) for each line, the feed amount is required to be maintained at 84 µm. In this case, the feed amount may be 42 µm, which is half of 84 µm, to improve image quality. Therefore, the platen roller 314 is generally driven by a motor. To maintain constant feed amount, it is desirable that friction between the support 11 and the platen roller 314 is high. For this purpose, a urethane-based material is preferred to be used for the platen roller 314.

It is preferred that an abrasion-resistant material is used for the surface of the platen roller 314. The surface of the platen roller 314 is required to have high shape accuracy. Thus, usually, the surface of the platen roller 314 is subjected to precision polishing. Therefore, if an easy-to-wear material is used for the surface of the platen roller 314, the surface may be roughened due to polishing and asperities may be produced on the surface. Such asperities may lead to not only unstable transfer but also reduction in contact area with the support 11. Consequently, friction between the support 11 and the platen roller 314 may be reduced.

As mentioned above, the surface of the platen roller 314 has high shape accuracy. Also, the surface of the thermal head 312 facing the platen roller 314 has high shape accuracy. The transfer foil 2 and the support 11 are sandwiched between the thermal head 312 and the platen roller 314 and thermally pressed in this state. Consequently, the adhesive layer 224 is fused so that the transfer foil 2 and the support 11 are adhered to each other.

The release plate 315, together with the guide rollers 316b and 316c, branches off the conveying direction of the support 11 from that of the transfer foil 2. Thus, the support 11 and the transfer foil 2 are separated from each other. The support 11 and the transfer foil can be separated from each other with minimum force if the conveying direction of the support 11 is substantially perpendicular to the conveying direction of the transfer foil 2.

After the transfer foil 2 and the support 11 have passed between the thermal head 312 and the platen roller 314, the temperature of the thermally pressed portions of the transfer layer 22 lowers, and the adhesion of these portions with the support 11 is enhanced accordingly even more than the adhesion thereof with the substrate 21. Then, when the support 11 and the transfer foil 2 are separated from each other, the thermally pressed portions of the transfer layer 22 are separated from the substrate 21, maintaining adhesion with the support 11. Portions of the transfer foil 22 which have not been thermally pressed are separated from the support 11, maintaining adhesion with the substrate 21. In this way, the first image I1 shown in FIG. 1 is recorded on the support 11.

The computer 32 shown in FIG. 6 may be connected to the transfer device 31 in a wired or wireless manner. As shown in FIG. 7, the computer 32 includes a hardware device 321, an input device 322 and an output device 323.

The hardware device 321 includes a central processing unit (CPU) 3211, a main storage 3212, and an auxiliary storage 3213.

The central processing unit 3211 performs arithmetic processing, such as conversion of image data, or exercises overall control according to predetermined programs.

The main storage 3212 includes a random access memory (RAM). Data or programs are read into the main storage 3212. These programs include a program for allowing the computer 32 to execute the processing described referring to FIGS. 8 to 14.

For example, the auxiliary storage 3213 is a hard disc drive (HDD) or a solid state drive (SSD). For example, the auxiliary storage 3213 may store part of the programs or data read into the main storage 3212. The auxiliary storage 3213 may further include a device to which a removable medium can be connected or installed, e.g., a card reader to which a memory card can be connected, or a disc drive to which an optical disc or a magnetic disc can be installed. The programs or data may be recorded on these recording media. The recording media herein refer to non-transitory computer readable media.

For example, the input device 322 includes a keyboard and a mouse. The input device 322 may further include another device, e.g., a digital camera.

The output device 323 may include a display, for example. The transfer device 31 shown in FIG. 6 is connected to the hardware device 321 as another output device.

For example, the display 1 may be produced using the production system 3 through the method described below.

First, first image data is acquired as original image data. The first image data is acquired by, for example, capturing an image of a person by a digital camera. Alternatively, the first image data may be acquired by reading an image using a scanner. The first image data inputted to the hardware device 321 is temporarily stored in the main storage 3212.

Next, the operator may input a command or the like into the hardware device 321 via the input device 322. When the command or the like is inputted to the hardware device 321, the main storage 3212 reads the programs or data stored in the auxiliary storage 3213, and the central processing unit 3211 performs arithmetic processing, such as data conversion, according to the programs. Specifically, the central processing unit 3211 produces fourth image data, which will be described later, from the first image data and the produced fourth image data is converted to a form suitable for the transfer device 31. Furthermore, the central processing unit 3211 produces a signal to be supplied to the display so that the operator can confirm that the processing is correctly performed, via the image displayed on the display.

After that, the transfer device 31 shown in FIG. 6 transfers portions of the transfer layer 22 to the support 11 to record the first image I1 corresponding to the fourth image data on the support 11.

As described above, the thermal head 312 heats the transfer foil 2, for example, for each line. Accordingly, the computer 32 converts the fourth image data to a collection of line data and sequentially supplies the line data to the transfer device 31. In place of adopting a configuration in which the computer 32 performs conversion to line data, the transfer device 31 may be provided with a dedicated board for performing conversion to line data.

Next, a method of producing image data will be described.

Figure 8:
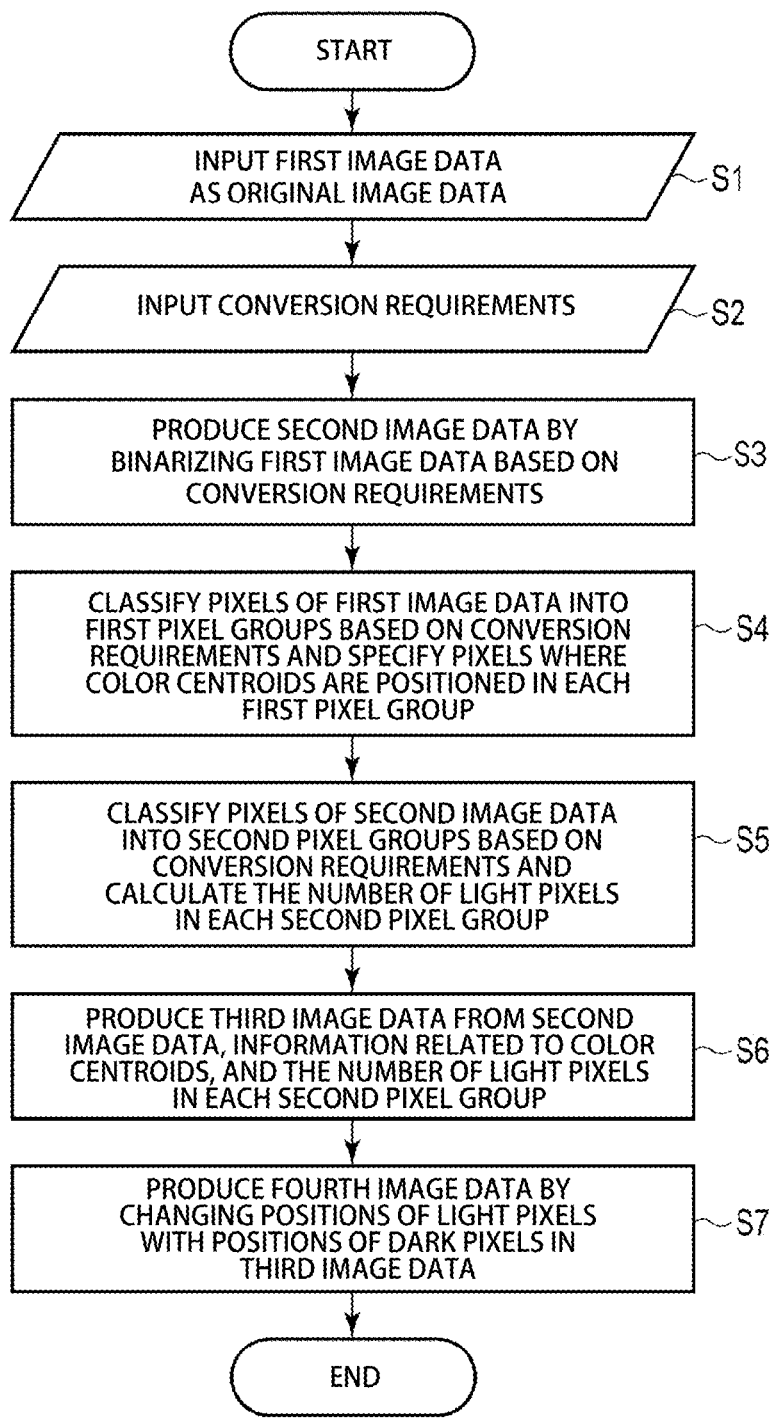
FIG. 8 is a flow diagram illustrating a method of producing a display according to an embodiment of the present invention.
Figure 9:
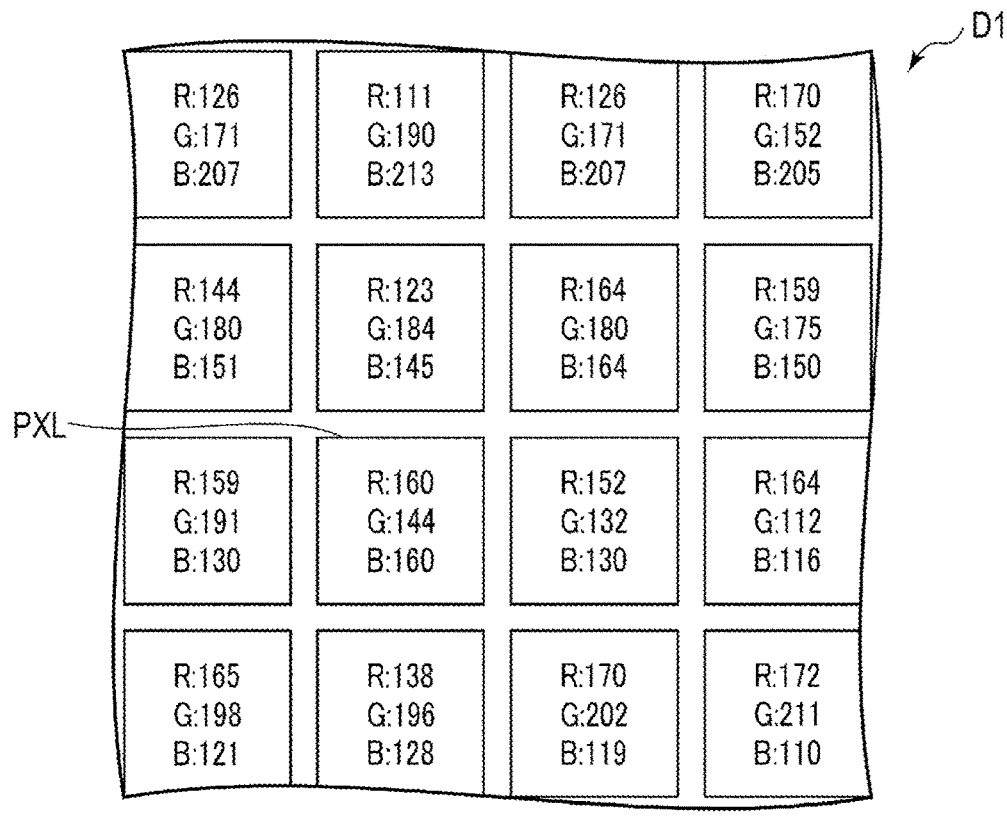
FIG. 9 is a diagram illustrating an example of first image data.
Figure 10:
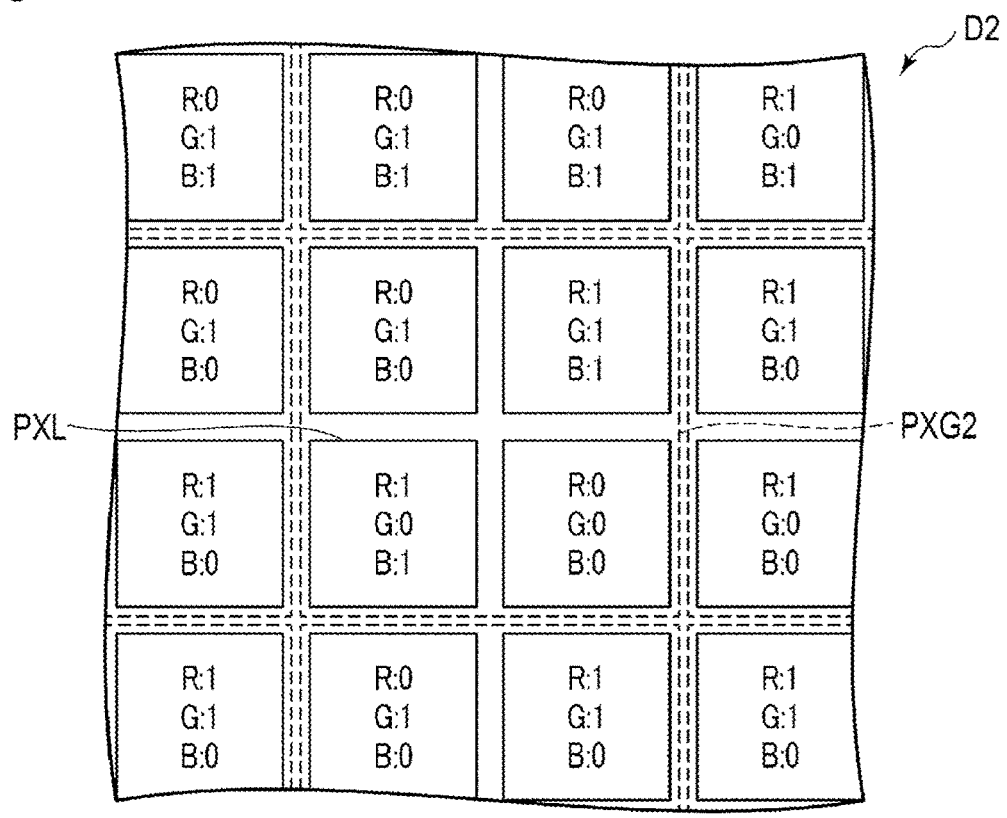
FIG. 10 is a diagram illustrating an example of second image data.
Figure 11:
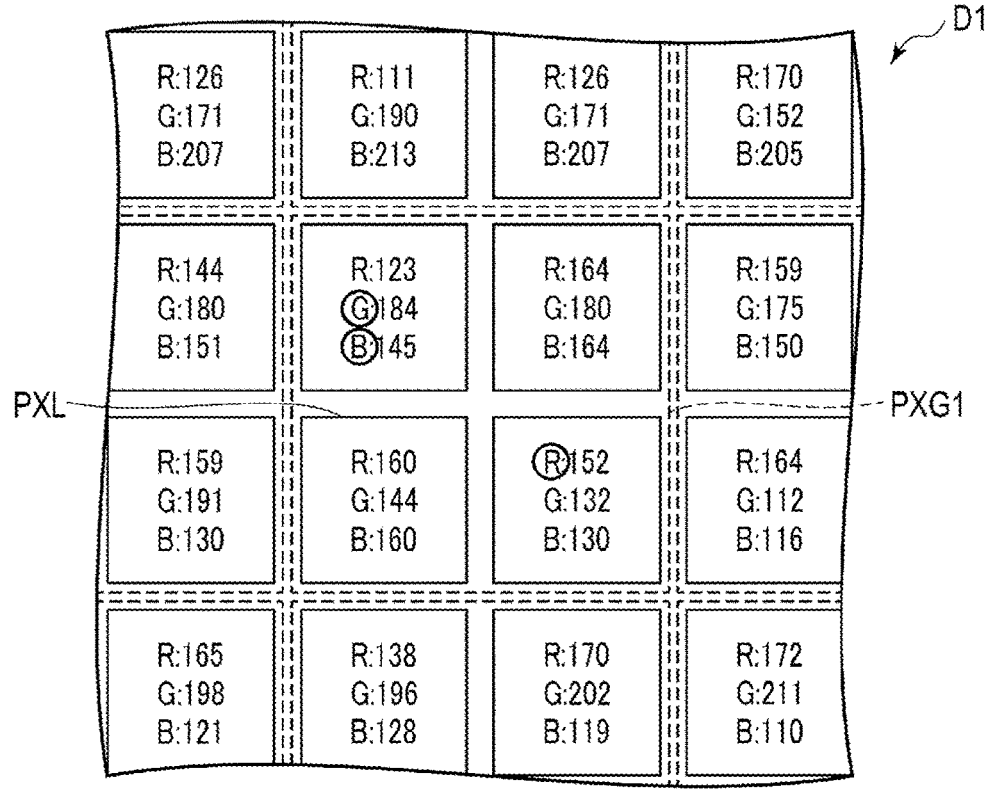
FIG. 11 is a diagram illustrating an example of an arrangement of first pixel groups and pixels where color centroids are positioned.
Figure 12:
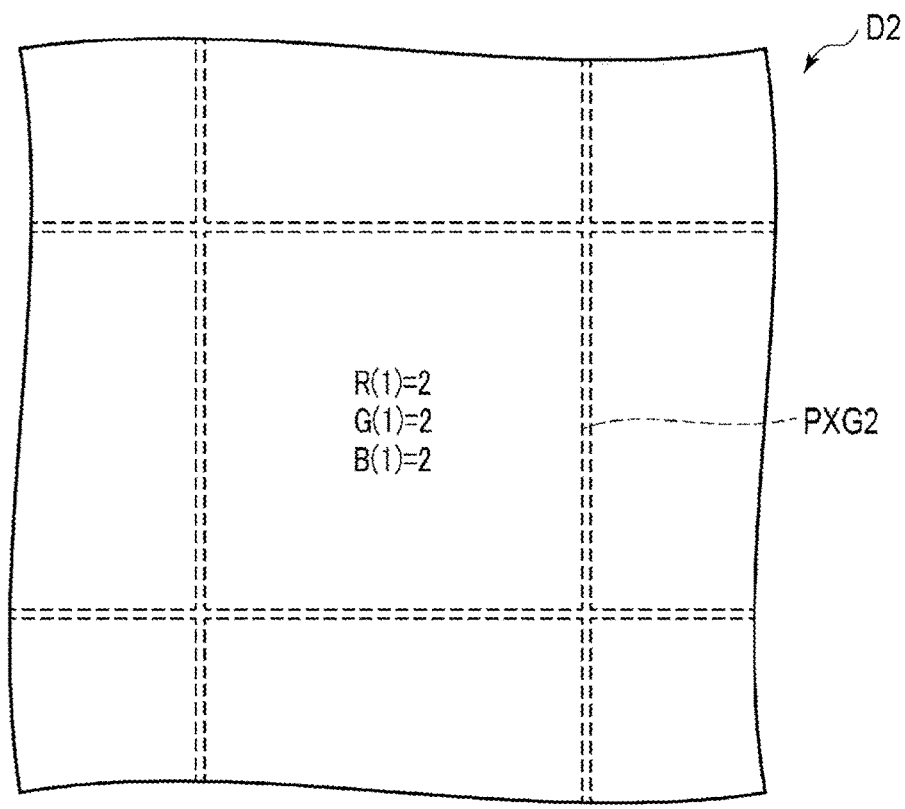
FIG. 12 is a diagram illustrating an example of the number of light pixels included in a second pixel group.
Figure 13:
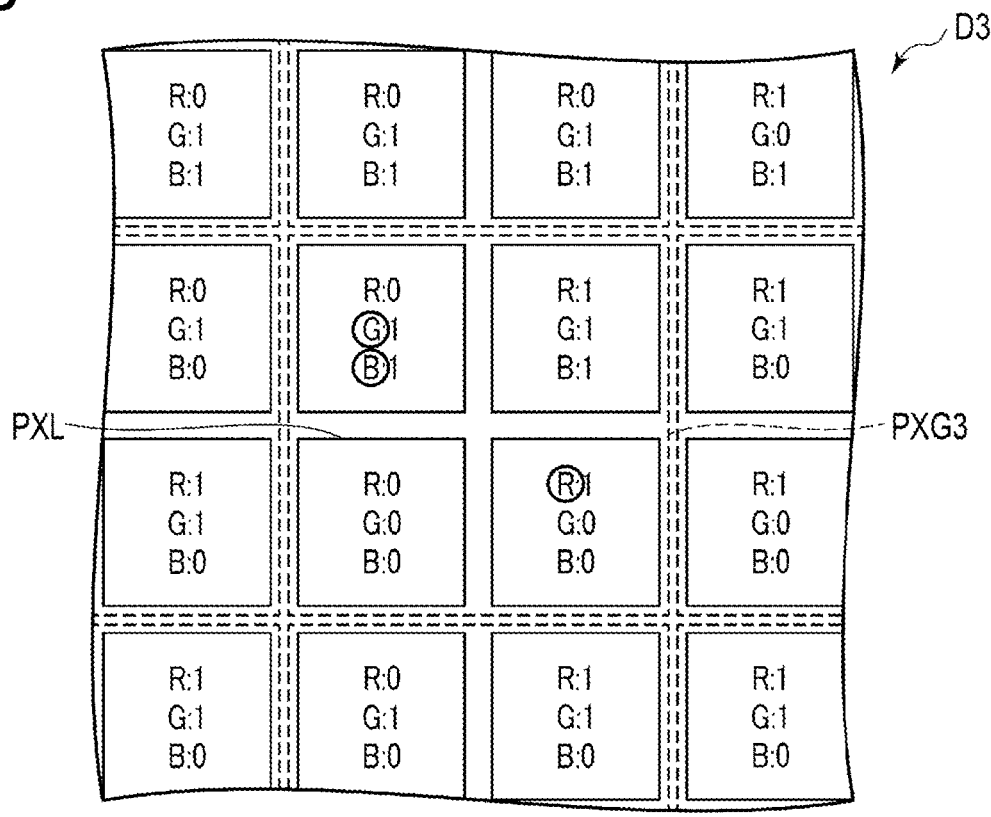
FIG. 13 is a diagram illustrating an example of third image data.
Figure 14:
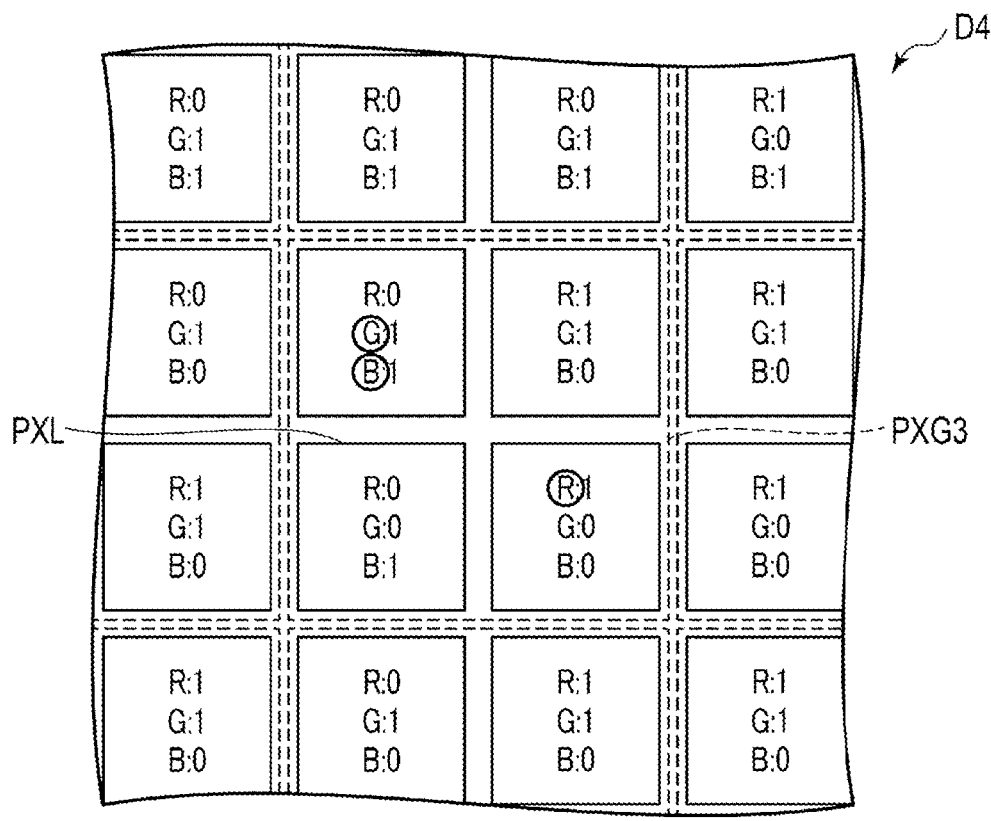
FIG. 14 is a diagram illustrating an example of fourth image data.

FIG. 8 is a flow diagram illustrating a method of producing a display according to an embodiment of the present invention. FIG. 9 is a diagram illustrating an example of first image data. FIG. 10 is a diagram illustrating an example of second image data. FIG. 11 is a diagram illustrating an example of an arrangement of first pixel groups and pixels where color centroids are positioned. FIG. 12 is a diagram illustrating an example of the number of light pixels included in a second pixel group. FIG. 13 is a diagram illustrating an example of third image data. FIG. 14 is a diagram illustrating an example of fourth image data.

It should be noted that FIGS. 9 to 14 are only schematic diagrams illustrating image data for ease of understanding the configuration and conversion, and do not express actual image data. Furthermore, in FIGS. 9 to 11, 13 and 14, numerals following R:, G: and B: respectively indicate tone values of red, green and blue. In FIGS. 11, 13 and 14, the pixel PXL including a circled R:, circled G: or circled B: is a pixel where a red color centroid, a green color centroid, or a blue color centroid is positioned respectively in a first pixel group PXG1 or a third pixel group PXG3. In FIG. 12, numerals following R(1)=, G(1)= and B(1)= respectively indicate the number of pixels PXL in which the tone value of red is 1, the number of pixels PXL in which the tone value of green is 1, and the number of pixels PXL in which the tone value of blue is 1 in a second pixel group PXG2 of second image data D2.

In this method, first image data D1 shown in FIG. 9 is firstly prepared as original image data. The first image data D1 is color image data expressed by two or more colors in which each pixel PXL has colors each having a tone value corresponding to three or more levels. The first image data D1 is digital data including information which relates to the positions of the pixels PXL and the tone values of the respective colors in each of the pixels PXL. Herein, the pixels PXL are arranged in a matrix, i.e., arranged in two directions intersecting each other. Specifically, the original image is a raster image which is a color image expressed by two or more colors, and more preferably three or more colors. In the first image data D1, the number of gradation levels of each color is three or more. According to an example, the first image data D1 is digital data in which first to third different colors each have a tone value corresponding to three or more levels in each pixel PXL. In the example shown in FIG. 9, the first image data D1 is digital data in which red, green and blue colors each have a tone value of any of 256 levels in each pixel PXL. The number of pixels of the first image data is assumed to be N times (N is an integer that is 2 or more) of the number of pixels PX of the display 1 shown in FIG. 2.

Next, for example, as shown in FIG. 8, the operator may input the first image data D1 shown in FIG. 9 into the hardware device 321 shown in FIG. 7 (step S1).

Next, as shown in FIG. 8, the operator may input conversion requirements into the hardware device 321 via the input device 322 shown in FIG. 7 (step S2). The conversion requirements refer to requirements used for producing fourth image data D4 shown in FIG. 14 from the first image data D1 shown in FIG. 9. For example, these requirements include information related to thresholds and arrangement of the pixels PXL in a first image group PXG1, which will be described later. It should be noted that steps S1 and S2 may be performed in reverse order.

After completing the above input, the hardware device 321 shown in FIG. 7 produces fourth image data D4 shown in FIG. 14 according to the programs stored in the auxiliary storage 3213.

First, as shown in FIG. 8, the hardware device 321 binarizes the tone values of the first image data D1 shown in FIG. 9 based on the above conversion requirements (step S3). Thus, the hardware device 321 produces second image data D2, as shown in FIG. 10, in which each pixel PXL has binarized tone values for the respective colors.

Herein, if the first image data D1 shown in FIG. 9 includes one or more pixels PXL in which red has tone values of less than a first threshold, the tone values of red in the corresponding pixels PXL in the second data D2 shown in FIG. 10 are each set to 0, and the tone values of red in the remaining pixels PXL are each set to 1. If the first image data D1 shown in FIG. 9 includes one or more pixels PXL in which green has tone values of less than a second threshold, the tone values of green in the corresponding pixels PXL in the second data D2 shown in FIG. 10 are each set to 0, and the tone values of green in the remaining pixels PXL are each set to 1. If the first image data D1 shown in FIG. 9 includes one or more pixels PXL in which blue has tone values of less than a third threshold, the tone values of blue in the corresponding pixels PXL in the second data D2 shown in FIG. 10 are each set to 0, and the tone values of blue in the remaining pixels PXL are each set to 1. The first to third thresholds may be equal to or different from each other.

As shown in FIG. 8, the hardware device 321 classifies the pixels PXL of the first image data D1 shown in FIG. 9 into a plurality of first pixel groups PXG1 shown in FIG. 11 based on the above conversion requirements, and specifies pixels PXL where a color centroid is positioned for each color in each of the first pixel groups PXG1 (step S4). Step S4 may be performed prior to step S3.

The classification in step S4 is performed on the original image so that the first pixel groups PXG1 are arranged in a matrix, i.e., arranged in two directions intersecting each other, and that each first pixel group PXG1 includes N adjacent pixels PXL (2×2=4 pixels PXL in this example). The N pixels PXL included in each first pixel group PXG1 may be arranged in two directions intersecting each other, or may be arranged in one direction.

A color centroid can be calculated using the following equation.

$$G = \frac{\sum_{i=1}^{N} m_i x_i}{\sum_{i=1}^{N} m_i} \qquad [\text{Math. 1}]$$

In the above equation, G indicates a coordinate of a color centroid related to a specific color in a specific first pixel group PXG1. m indicates a tone value related to the above color in an $i^{th}$ pixel PXL included in the above first pixel group PXG1. x indicates a coordinate of the $i^{th}$ pixel PXL included in the above first pixel group PXG1. N indicates the number of pixels PXL included in the above first pixel group PXG1.

Calculation of a coordinate G of a color centroid is based on the following assumptions. Specifically, the pixels PXL are assumed to have square shapes of the same size, and to be arranged in two directions perpendicular to each other without an interval therebetween. The coordinate xi of the $i^{th}$ pixel PXL is assumed to be the coordinate at the center of the pixel PXL.

In the first pixel group PXG1 at the center of FIG. 11, the pixel PXL where the red color centroid is positioned is the lower right pixel PXL. Also, the pixel where a green color centroid and a blue color centroid are positioned is the upper left pixel PXL.

As shown in FIG. 8, the hardware device 321 classifies the pixels PXL of the second image data D2 shown in FIG. 10 into a plurality of second pixel groups PXG2 corresponding to the first pixel group PXG1 shown in FIG. 11 based on the above conversion requirements, and calculates the number of light pixels for each color and for each second pixel group PXG2 (step S5). Step S5 may be performed prior to step S4.

A pixel PXL that is a "light pixel" for a specific color refers to a pixel PXL having a tone value of 1 for this color in the second image data D2. A pixel PXL that is a "dark pixel" for a specific color refers to a pixel PXL having a tone value of 0 for this color in the second image data D2. As shown in FIG. 12, in the second pixel group PXG2 at the center of FIG. 10, the number of light pixels for all of red, green and blue is two.

Next, as shown in FIG. 8, the hardware device 321 produces third image data D3 shown in FIG. 13, based on the second image data D2 shown in FIG. 10, the information related to color centroids shown in FIG. 11, and the information related to the number of light pixels shown in FIG. 12 (step S6).

The third image data D3 includes binarized tone values for each color and for each pixel PXL. The pixels PXL of the third image data D3 are classified into a plurality of third pixel groups PXG3 corresponding to the first pixel groups PXG1 shown in FIG. 11 and the second pixel groups PXG2 shown in FIGS. 10 and 12.

The hardware device 321 produces the third image data D3 so that, for each color, the number of light pixels in each third pixel group PXG3 is equal to the number of light pixels in the corresponding one of the second pixel groups PXG2, and that, for each color, the position of one of the light pixels in each third pixel group PXG3 including light pixels matches the position of the pixel PXL where the color centroid is positioned in the corresponding one of the first pixel groups PXG1. Preferably, in addition to the above requirements, the hardware device 321 may produce the third image data D3 so that, for each color, the positions of one or more dark pixels in each third pixel group PXG3 including two or more light pixels and one or more dark pixels match the positions of pixels having lower tone values, except for the pixel PXL in which the color centroid is positioned, in the corresponding one of the first image groups PXG1.

The third pixel group PXG3 at the center of FIG. 13 corresponds to the first pixel group PXG1 at the center of FIG. 11 and the second pixel group PXG2 at the center of FIG. 12.

As mentioned above, in the first pixel group PXG1 at the center of FIG. 11, the pixel PXL where the red color centroid is positioned is the lower right pixel PXL. Also, as mentioned above, in the second pixel group PXG2 at the center of FIG. 12, the number of light pixels of red is two. In the first pixel group PXG1 at the center of FIG. 11, except for the lower right pixel PXL where the red color centroid is positioned, the upper left pixel PXL has the lowest tone value and the lower left pixel PXL has the second lowest tone value. Accordingly, in the third pixel group PXG3 at the center of FIG. 13, when red is concerned, the lower right pixel PXL and the upper right pixel PXL are light pixels, and the upper left pixel PXL and the lower left pixel PXL are dark pixels.

As mentioned above, in the first pixel group PXG1 at the center of FIG. 11, the pixel PXL where the green color centroid is positioned is the upper left pixel PXL. Also, as mentioned above, in the second pixel group PXG2 at the center of FIG. 12, the number of light pixels of green is two. In the first pixel group PXG1 at the center of FIG. 11, except for the upper left pixel PXL where the green color centroid is positioned, the lower right pixel PXL has the lowest tone value and the lower left pixel PXL has the second lowest tone value. Accordingly, in the third pixel group PXG3 at the center of FIG. 13, when green is concerned, the upper left pixel PXL and the upper right pixel PXL are light pixels, and the lower right pixel PXL and the lower left pixel PXL are dark pixels.

As mentioned above, in the first pixel group PXG1 at the center of FIG. 11, the pixel PXL where the blue color centroid is positioned is the upper left pixel PXL. Also, as mentioned above, in the second pixel group PXG2 at the center of FIG. 12, the number of light pixels of blue is two. In the first pixel group PXG1 at the center of FIG. 11, except for the upper left pixel PXL where the blue color centroid is positioned, the lower right pixel PXL has the lowest tone value and the lower left pixel PXL has the second lowest tone value. Accordingly, in the third pixel group PXG3 at the center of FIG. 13, when blue is concerned, the upper left pixel PXL and the upper right pixel PXL are light pixels, and the lower right pixel PXL and the lower left pixel PXL are dark pixels.

Next, as shown in FIG. 8, the hardware device 321 produces fourth image data D4 shown in FIG. 14, by changing the positions of light and dark pixels in the third image data D3 shown in FIG. 13 (step S7).

Specifically, the hardware device 321 selects pixels PXL each being light for all the colors from the third image data D3 shown in FIG. 13. When the pixel PXL selected for at least one color does not correspond to the pixel PXL where the color centroid is positioned in the first pixel group PXG1, and when the third pixel group PXG3 including the selected pixel PXL includes one or more dark pixels, the hardware device 321 changes the selected pixel PXL from light to dark and changes one other pixel PXL from dark to light, for at least one of the at least one color in the third pixel group PXG3 including the selected pixel PXL. Thus, the hardware device 321 produces the fourth image data D4 including a smaller number of pixels PXL each being light for all the colors, than in the third image data D3.

Preferably, in addition to the above requirements, when the third pixel group PXG3 including the selected pixel PXL for at least one of the at least one color includes two or more dark pixels, the hardware device 321 may produce the fourth image data D4 so that the position of the pixel PXL which is changed from dark to light and the position of the pixel PXL which is not changed from dark to light in the third pixel group PXG3 including the selected pixel PXL respectively match the position of the pixel PXL having a higher tone value and the position of the pixel PXL having a lower tone value in the corresponding one of the first pixel groups PXG1.

Preferably, the hardware device 321 may change pixels from light to dark, or vice versa, in the order of blue, green and red. The red color may greatly affect the skin color of the person in the first image I1 shown in FIG. 1. The green color may greatly affect the degree of accuracy perceived by the observer.

In the third image data D3 shown in FIG. 13, of the four pixels PXL included in the third image group PXG3 at the center, the upper right pixel PXL is light for all the colors. This upper right pixel PXL is a pixel PXL where none of the color centroids of red, green and blue is positioned in the first pixel group PXG1. The third pixel group PXG3 at the center includes two dark pixels for each of the red, green and blue colors.

As mentioned above, in the third pixel group PXG3 at the center, dark pixels for blue are the lower left and lower right pixels PXL. As shown in FIG. 11, in the first pixel group PXG1 corresponding to this third pixel group PXG3, when blue is concerned, the lower left pixel PXL has a higher tone value, while the lower right pixel PXL has a lower tone value. Accordingly, in the third pixel group PXG3 at the center of FIG. 14, when contrasted with the third pixel group PXG3 at the center of FIG. 13, the upper right pixel PXL has been changed from light blue to dark blue, while the lower left pixel PXL has been changed from dark blue to light blue, with the lower right pixel PXL remaining in dark blue. Consequently, while the upper right pixel PXL in the third pixel group PXG3 at the center of FIG. 14 has been light for all the colors of red, green and blue, the third pixel group PXG3 at the center of FIG. 14 has no pixel PXL which is light for all the colors of red, green and blue.

If the first image I1 shown in FIG. 1 is recorded based on the fourth image data D4 obtained in this way, an image which the observer may perceive to have higher quality can be obtained, compared to the case where the first image I1 is recorded based on the second image data D2 or the third image data D3. This will be described below.

In at least one of the second pixel groups PXG2 including one or more light pixels for a specific color in the second image data D2, the position of none of the light pixels in the second pixel group PXG2 matches the position of the pixel PXL where the centroid of the color is positioned in the corresponding one of the first pixel groups PXG1. In contrast, in each of the third pixel groups PXG3 including one or more light pixels for a specific color in the fourth image data D4, the position of one of the light pixels in the third pixel group PXG3 matches the position of the pixel PXL where the centroid of the color is positioned in the corresponding one of the first pixel groups PXG1. If the first image I1 shown in FIG. 1 is recorded based on the fourth image data D4 having a difference in this regard, the observer may perceive the image to have higher definition, compared to the case where the first image I1 shown in FIG. 1 is recorded based on the second image data D2.

When producing the display 1 shown in FIGS. 1 to 3, the display elements 12R, 12G and 12B are arranged using thermal transfer. Therefore, in the subpixel including the display elements 12R, 12G and 12B, the firstly transferred element, e.g., the display element 12R, among the display elements 12R, 12G and 12B is subjected to thermal pressure three or more times. If the display elements 12R, 12G and 12B are subjected to thermal pressure several times, the shape accuracy of the diffractive structure DG is impaired, resulting in blushing of the displayed colors.

The fourth image data D4 produced through the method described above has a smaller number of pixels PXL each being light for all the colors, than in the third image data D3. The third pixel groups PXG3 and the pixels PXL of the fourth image data D4 respectively correspond to the pixels PX and the subpixels SPX of the display 1 shown in FIG. 2. Therefore, if the first image I1 shown in FIG. 1 is recorded based on the fourth image data D4, the number of subpixels SPX, in each of which the display elements 12R, 12G and 12B shown in FIGS. 2 and 3 are overlapped with each other, can be reduced, compared to the case where the first image I1 shown in FIG. 1 is recorded based on the third image data D3. Accordingly, if the first image I1 shown in FIG. 1 is recorded based on the fourth image data D4, degradation of image quality due to blushing can be reduced, compared to the case where the first image I1 shown in FIG. 1 is recorded based on the third image data D3.

If the first image I1 shown in FIG. 1 includes a region which the observer should perceive to have the same color throughout, and if there is a great difference in the number of the display elements 12R, 12G and 12B between the subpixels SPX in each pixel PX included in the region, the observer may feel the color to be discontinuous when observing the region. For example, let us assume a situation where each of multiple pixels PX adjacent to each other includes two subpixels SPX both of which include the display elements 12R, 12G and 12B and two subpixels SPX neither of which includes the display elements 12R, 12G and 12B (termed blank subpixels hereinafter). In this case, if the blank subpixels of a first PX are adjacent to the blank subpixels of a second pixel PX which is adjacent to the first pixel PX, the observer may perceive difference in color between the portion where the blank subpixels are collected and other portions, and may resultantly perceive the color to be discontinuous.

The fourth image data D4 produced through the method described above has a smaller number of pixels PXL each being dark for all the colors, than in the second image data D2 and the third image data D3. For example, in the second image data D2 shown in FIG. 10, the lower right pixel PXL in the second pixel group PXG2 at the center is dark for all the colors. In the third image data D3 shown in FIG. 13, the lower left pixel PXL in the third pixel group PXG3 at the center is dark for all the colors. In contrast, in the fourth image data D4 shown in FIG. 14, the third image group PXG3 at the center does not include pixels PXL each being dark for all the colors. Therefore, if the first image I1 shown in FIG. 1 is recorded based on the fourth image data D4, the observer is less likely to perceive the image to be unnatural, compared to the case where the first image I1 shown in FIG. 1 is recorded based on the second image data D2 or the third data D3.

EXAMPLES

Examples of the present invention will be described below.

Example

Through the method described referring to FIGS. 1 to 14, a first image I1 was recorded on a support 11.

The transfer foil 2 herein had the following configuration. The reflective layer 223 was formed by depositing zinc sulfide with a thickness of 80 nm. In the following description, the term part(s) refers to part(s) by mass.

Substrate 21
Lumirror (trademark) S10 manufactured by Toray Industries, Inc.
12 μm thickness Back Coat Layer 23

| | |
|---|---|
| SYMAC (trademark) US352 manufactured by Toagosei Co., Ltd. | 100 parts |
| 0.8 μm thickness | |

Protective Layer 225

| | |
|---|---|
| MCS5041 manufactured by DIC Corporation | 100 parts |
| 0.7 μm thickness | |

Relief Structure Forming Layer 222

| | |
|---|---|
| MCA4039 manufactured by DIC Corporation | 100 parts |
| 0.7 μm thickness | |

Adhesive Layer 224

| | |
|---|---|
| Vylon (trademark) 30SS manufactured by Toyobo Co., Ltd. | 50 parts |
| EP1001 manufactured by Mitsubishi Chemical Corporation | 50 parts |
| 0.5 μm thickness | |

As a transfer target herein, one in which an image-receiving layer was provided on the support 11 was used. The following materials were used for the support 11 and the image-receiving layer.

Support 11
Lumirror (trademark) S10 manufactured by Toray Industries, Inc.
25 μm thickness
Image-Receiving Layer

| | |
|---|---|
| EP1007 manufactured by Mitsubishi Chemical Corporation | 100 parts |
| 3.5 μm thickness | |

As the first image data D1, five pieces of image data respectively including facial images A to E of different persons were prepared. These pieces of image data are raster data in which the number of gradation levels was 256 for each of red, green and blue. The first to third thresholds were each 128.

As the transfer device 31, one capable of transfer with a resolution of 300 dpi and having heating elements with an average resistance of 3,500Ω was used. Transfer with the transfer device 31 was performed by applying a voltage of 25 V to the thermal head 312.

Comparative Example 1

A first image I1 was recorded on a support 11 as in the example, except that image data obtained by converting the first image data D1 by a quadrature error diffusion method was used, instead of the fourth image data D4.

Comparative Example 2

First, fifth image data was prepared. The fifth image data is similar to the fourth image data D4 except for the following points.

The fifth image data is different from the fourth image data D4 in the arrangement of light pixels in the third pixels PXG3. Specifically, in third pixel groups PXG3 each having one light pixel for a specific color in the fifth image data, the position of the light pixel of the specific color matches the position of the upper left pixel PXL. Also, in third pixel groups PXG3 each having two light pixels for a specific color in the fifth image data, the positions of the light pixels of the specific color match the positions of the upper left pixel PXL and the lower right pixel PXL. Furthermore, in third pixel groups PXG3 each having three light pixels for a specific color in the fifth image data, the positions of the light pixels of the specific color match the positions of the lower left pixel PXL, the upper right pixel PXL and the lower right pixel PXL.

Next, a first image I1 was recorded on a support 11 as in the example, except that the fifth image data was used, instead of the fourth image data D4.

EVALUATION

The first images I1 of the displays 1 obtained in the example and Comparative Examples 1 and 2 were evaluated by multiple evaluators. The images were evaluated by visual inspection in terms reproducibility of the original images, and visibility including colors, smoothness, and the like. For the facial images of the same person, if more than half the evaluators determined the first image I1 of the display 1 obtained in the example to be better than the first images I1 of the displays 1 obtained in Comparative Examples 1 and 2, the image was evaluated to be good. The table below shows the results.

TABLE 1

| | Reproducibility | Visibility |
|---|---|---|
| Facial image of person A | Good | Good |
| Facial image of person B | Good | Good |
| Facial image of person C | Good | Good |
| Facial image of person D | Good | Good |
| Facial image of person E | Good | Good |

As shown in the table above, for the facial images of all the persons, many evaluators evaluated the first images I1 of the displays 1 obtained in the example to be better than the first images I1 of the displays 1 obtained in Comparative Examples 1 and 2, in terms of both reproducibility and visibility.

REFERENCE SIGNS LIST

1 . . . Display; 2 . . . Transfer foil; 3 . . . Production system; 11 . . . Support; 12B . . . Display element; 12G . . . Display element; 12R . . . Display element; 13 . . . Resin layer; 14 . . . Protective layer; 21 . . . Substrate; 22 . . . Transfer layer; 23 . . . Back coat layer; 31 . . . Transfer device; 32 . . . Computer; 122 . . . Relief structure forming layer; 123 . . . Reflective layer; 124 . . . Adhesive layer; 125 . . . Protective layer; 222 . . . Relief structure forming layer; 223 . . . Reflective layer; 224 . . . Adhesive layer; 225 . . . Protective layer; 311 . . . Unwinding part; 312 . . . Thermal head; 313 . . . Take-up part; 314 . . . Platen roller; 315 . . . Release layer; 316a . . . Guide roller; 316b . . . Guide roller; 316c . . . Guide roller; 321 . . . Hardware device; 322 . . . Input device; 323 . . . Output device; 3211 . . . Central processing unit; 3212 . . . Main storage; 3213 . . . Auxiliary storage; D1 . . . First image data; D2 . . . Second image data; D3 . . . Third image data; D4 . . . Fourth image data; DG . . . Diffractive structure; I1 . . . First image; I2 . . . Second image; I3 . . . Third image; PX . . . Pixel; PXG1 . . . First pixel group; PXG2 . . . Second pixel group; PXG3 . . . Third pixel group; PXL . . . Pixel; SPX . . . Subpixel.

What is claimed is:

1. A method of producing image data, comprising the steps of:
preparing first image data as data of a color image expressed by two or more colors, the first image data including pixels each having colors with respective tone values each corresponding to three or more levels;
binarizing the tone values of the first image data to produce second image data, the second image data including pixels each having colors with respective binarized tone values;
classifying the pixels of the first image data into a plurality of first pixel groups and specifying a pixel where a color centroid is positioned for each color in each of the plurality of first pixel groups;
classifying the pixels of the second image data into a plurality of second pixel groups corresponding to the plurality of first pixel groups and calculating the number of light pixels for each color in each of the plurality of second pixel groups;
producing third image data including pixels each having colors with respective binarized tone values, the pixels being classified into a plurality of third pixel groups corresponding to the plurality of first pixel groups and the plurality of second pixel groups, the third image data being produced so that the number of light pixels for each color in each of the plurality of third pixel groups is equal to the number of light pixels in the corresponding one of the second pixel groups and so that, in each of the third pixel groups including the light pixels among the plurality of third pixel groups, the position of one of the light pixels matches the position of the pixel where the color centroid is positioned in the corresponding one of the first pixel groups; and producing fourth image data including a smaller number of pixels each of which is light for all colors than in the third image data, by selecting pixels each of which is light for all colors from the third image data and, when the selected pixel for at least one color does not correspond to the pixel where the color centroid is positioned in the first pixel group and when the third pixel group including the selected pixel includes at least one dark pixel, changing the selected pixel from light to dark for at least one of the at least one color and changing one other pixel from dark to light.

2. The method of producing image data of claim 1, wherein the third image data is produced so that, in each of the third pixel groups including two or more light pixels and at least one dark pixel for each color among the plurality of third pixel groups, the position of the at least one dark pixel matches the position of a pixel having a lower tone value, except for the pixel where the color centroid is positioned, in the corresponding one of the first pixel groups.

3. The method of producing image data of claim 1, wherein the fourth image data is produced so that, when the third pixel group including the selected pixel includes two or more dark pixels for at least one of the at least one color, the position of the pixel changed from dark to light and the position of the pixel that is not changed from dark to light in the third pixel group including the selected pixel respectively match the position of a pixel having a higher tone value and the position of a pixel having a lower tone value in the corresponding one of the first pixel groups.

4. The method of producing image data of claim 1, wherein the two or more colors are red, green and blue.

5. The method of producing image data of claim 4, wherein the change from light to dark and the change from dark to light are performed in the order of blue, green and red.

6. The method of producing image data of claim 1, wherein the color image includes a facial image.

7. A method of producing a display, comprising forming a first image on a transfer target by transferring two or more types of display elements respectively including diffractive structures and displaying colors different from each other onto the transfer target, based on the fourth image data obtained by the method of producing image data of claim 1.

8. The method of producing a display of claim 7, wherein, when there is a pixel that is light for two or more colors in the fourth image data, transfer is performed so that at least two types of display elements among the two or more types of display elements are overlapped with each other at the position on the transfer target corresponding to the pixel.

9. The method of producing a display of claim 7, wherein transfer is performed so that the two or more types of display elements are equal in shape and size.

10. The method of producing a display of claim 7, further comprising forming a second image having a shape similar to that of the first image and displayed using at least one of a dye and a pigment.

11. A display obtained by the production method of claim 7.

12. A program allowing a computer to execute the steps comprising:

a step of binarizing tone values of respective colors in each of pixels of first image data, the tone values each corresponding to three or more levels, the first image data being data of a color image expressed by two or more colors, and producing second image data having the binarized tone values of respective colors in each of the pixels;

a step of classifying the pixels of the first image data into a plurality of first pixel groups and specifying a pixel where a color centroid is positioned for each color in each of the plurality of first pixel groups;

a step of classifying the pixels of the second image data into a plurality of second pixel groups corresponding to the plurality of first pixel groups and calculating the number of light pixels for each color in each of the plurality of second pixel groups;

a step of producing third image data including pixels each having colors with respective binarized tone values, the pixels being classified into a plurality of third pixel groups corresponding to the plurality of first pixel groups and the plurality of second pixel groups, the third image data being produced so that the number of light pixels for each color in each of the plurality of third pixel groups is equal to the number of light pixels in the corresponding one of the second pixel groups and so that, in each of the third pixel groups including the light pixels among the plurality of third pixel groups, the position of one of the light pixels matches the position of the pixel where the color centroid is positioned in the corresponding one of the first pixel groups; and a step of producing fourth image data including a smaller number of pixels each of which is light for all colors than in the third image data, by selecting pixels each of which is light for all colors from the third image data and, when the selected pixel for at least one color does not correspond to the pixel where the color centroid is positioned in the first pixel group and when the third pixel group including the selected pixel includes at least one dark pixel, changing the selected pixel from light to dark for at least one of the at least one color and changing one other pixel from dark to light.

13. A computer readable recording medium in which the program of claim 12 is recorded.

14. A display production system comprising:

a computer in which the program of claim 12 is stored; and a transfer device that transfers two or more types of display elements onto a transfer target, the display elements respectively including diffractive structures and displaying colors different from each other.

15. The display production system of claim 14, wherein, when there is a pixel that is light for two or more colors in the fourth image data, transfer is performed so that at least two types of display elements among the two or more types of display elements are overlapped with each other at the position on the transfer target corresponding to the pixel.

* * * * *